Patented Oct. 20, 1953

2,656,243

UNITED STATES PATENT OFFICE 2,656,243

METHOD FOR STABILIZING ALKALI METAL AND ALKALINE EARTH METAL ALUMINUM HYDRIDES

Robert W. Bragdon, Marblehead, Mass., assignor to Metal Hydrides Incorporated, Beverly, Mass., a corporation of Massachusetts No Drawing. Application August 3, 1951,
Serial No. 240,278

3 Claims. (Cl. 23—14)

This invention relates to the production of alkali metal and alkaline earth metal aluminum hydrides and, more particularly, to the stabilization of these hydrides.

The alkali metal and alkaline earth metal aluminum hydrides may be prepared by reacting an aluminum halide, such as aluminum chloride, in solution in diethyl ether with an alkali metal hydride, such as lithium hydride, sodium hydride, etc., or an alkaline earth metal hydride, such as calcium hydride. One of the most important of these hydrides is lithium aluminum hydride having the formula $LiAlH_4$. If the reagents are mixed in the proportions of the following equation, or if an excess of lithium hydride is used, the reaction proceeds as follows:

(1) $\quad 4LiH + AlCl_3 \rightarrow LiAlH_4 + 3LiCl$

The lithium aluminum hydride is soluble in diethyl ether and remains in solution while the lithium chloride is precipitated and may be removed by filtration. The filtrate may be evaporated to recover lithium aluminum hydride as a white powder having the formula $LiAlH_4$.

However, if the reagents are mixed in the proportions of the following equation, the reaction proceeds as follows:

(2) $\quad 3LiH + AlCl_3 \rightarrow 3LiCl + AlH_3$

The lithium chloride may be removed by filtration. It is impossible to remove all the diethyl ether from the filtrate by evaporation without decomposing the hydride. If the ether is removed at room temperature without extensive evacuation the solid product is aluminum hydride diethyl etherate and has a composition approximating the formula $2AlH_3 \cdot O(C_2H_5)_2$.

The diethyl ether solution of lithium aluminum hydride produced as represented by Equation 1 above as well as a more concentrated solution obtained by the partial removal of the ether decompose during storage with evolution of a gas and the formation of a precipitate. This creates a serious problem in the storage and shipment of this product due to the gradual build up of gas pressure within the storage and shipping containers. The formation of the precipitate also is objectionable. The white lithium aluminum hydride powder obtained as previously described also is unstable and gradually turns gray during storage.

The cause of this unstableness is not definitely known. It is known, however, that the product produced by the reaction represented by Equation 1 above does contain a small amount of aluminum hydride which is not combined with lithium and may be formed as the result of a side reaction as represented by Equation 2 above and be present as the diethyl etherate. The amount of this impurity varies between about one half to about two per cent by weight with different runs. A small amount of one or more other side reaction products may be present which react with the aluminum hydride during storage to cause the unstableness previously mentioned.

The present invention contemplates the addition to a solid alkali metal or alkaline earth metal aluminum hydride or the diethyl ether solution thereof of a basic organic compound having unshared electrons adapted to combine preferentially with the aluminum hydride present as an impurity in the alkali metal or alkaline earth metal aluminum hydride or the solution thereof and thus stabilize the product. Effective stabilizing agents are basic organic compounds having a basic strength greater than diethyl ether and selected from the group consisting of cyclic ethers having a single oxygen atom in the molecule, straight chain and cyclic ethers having two or more oxygen atoms in their molecules and in which the oxygen atoms are separated by two or more carbon atoms and tertiary amines. Illustrative examples of such stabilizing agents are 1,4-dioxane, dimethyl cellosolve or other dialkyl cellosolve such as diethyl cellosolve, dimethyl carbitol, tetrahydrofuran, tetrahydropyran, furan, alpha-methylfuran, beta-methyltetrahydropyran, 2,5-dimethyl-1,4-dioxane, N-methyl morpholine, alphamethyl tetrahydrofuran, trimethylamine, triethylamine, etc.

In the practice of the invention, the stabilizing agent may be added to the solid dry double hydride and the mixture placed in a closed container. The stabilizing agent selected in such case should be volatile so that its vapor can react preferentially with the aluminum hydride impurity. The stabilizing agent may be added to the diethyl ether solution of the double hydride before the solution is evaporated either to dryness or merely to concentrate the solution. Some stabilizing agents, such as trimethylamine, form a volatile addition compound with aluminum hydride which can be removed during a vacuum drying operation. The amount of stabilizing agent required is the amount required to react preferentially with all the aluminum hydride impurity present. A small excess is not harmful. In general, an amount of stabilizing agent between about one to about six per cent by weight of the double hydride is satisfactory. In any event, after the above treatment, the product may be placed in a closed container for storage or shipment without danger.

I claim:

1. The method for producing and stabilizing a product selected from the group consisting of an alkali metal aluminum hydride and an alkaline earth metal aluminum hydride which comprises reacting a metal hydride selected from the group consisting of an alkali metal hydride and an alkaline earth metal hydride with an aluminum halide in solution in diethyl ether thereby obtaining a solution of said product containing a solid by-product, removing said solid from said solution, thereafter removing the diethyl ether from said solution to obtain said product in solid form, and bringing said solid product in contact with an ether selected from the group consisting of dimethyl cellosolve, diethyl cellosolve, thereby stabilizing said product for storage.

2. The method as described by claim 1 wherein the organic compound is dimethyl cellosolve.

3. The method as described by claim 1 wherein the organic compound is diethyl cellosolve.

ROBERT W. BRAGDON.

References Cited in the file of this patent

UNITED STATES PATENTS

| Number | Name | Date |
| --- | --- | --- |
| 2,576,311 | Schlesinger | Nov. 27, 1951 |